Oct. 29, 1929.　　　　R. V. WOODWORTH　　　　1,733,638
CUTTING DIE
Filed Sept. 19, 1928　　　　2 Sheets-Sheet 1
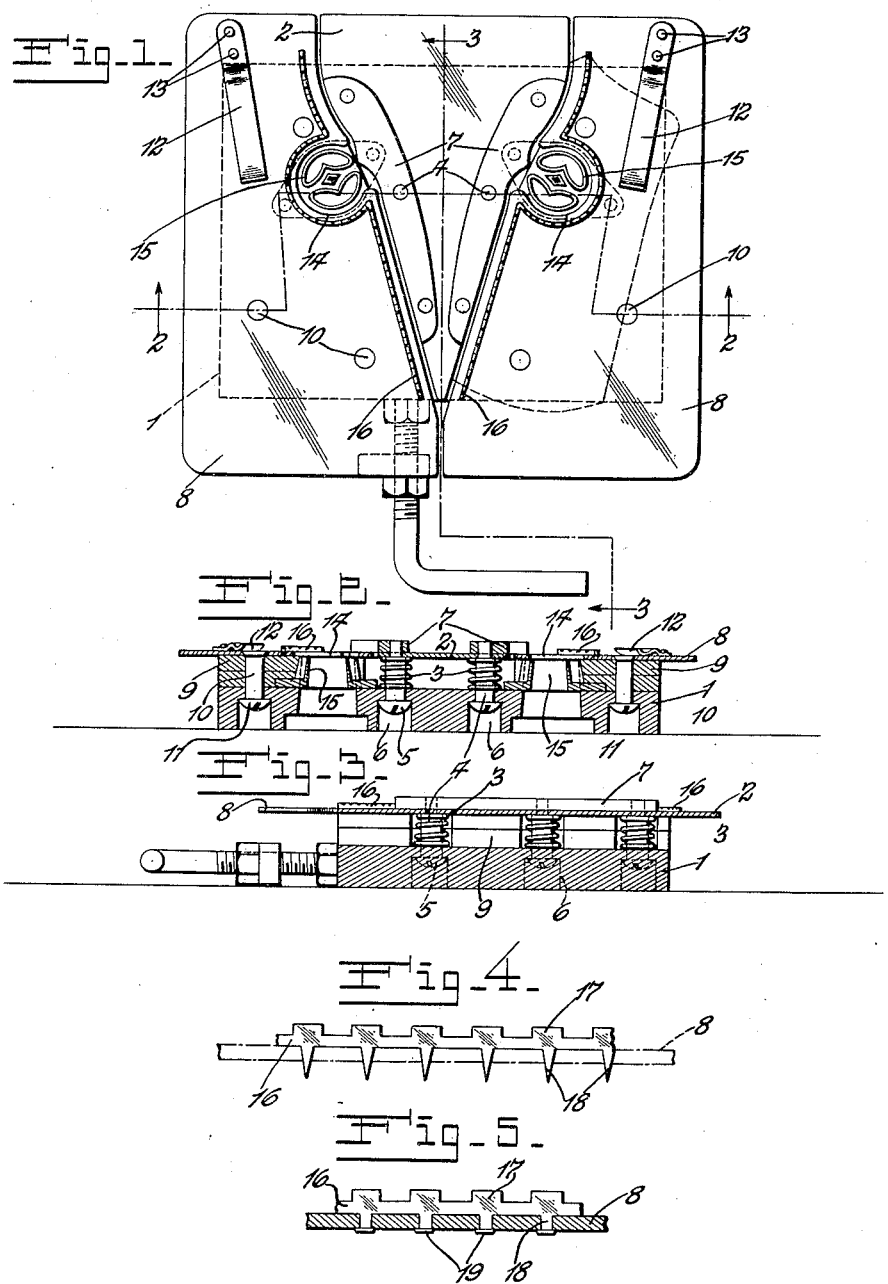
Inventor:
Roy V. Woodworth,
by Rippey & Kingsland
His Attorneys.

Oct. 29, 1929.  R. V. WOODWORTH  1,733,638
CUTTING DIE
Filed Sept. 19, 1928   2 Sheets-Sheet 2
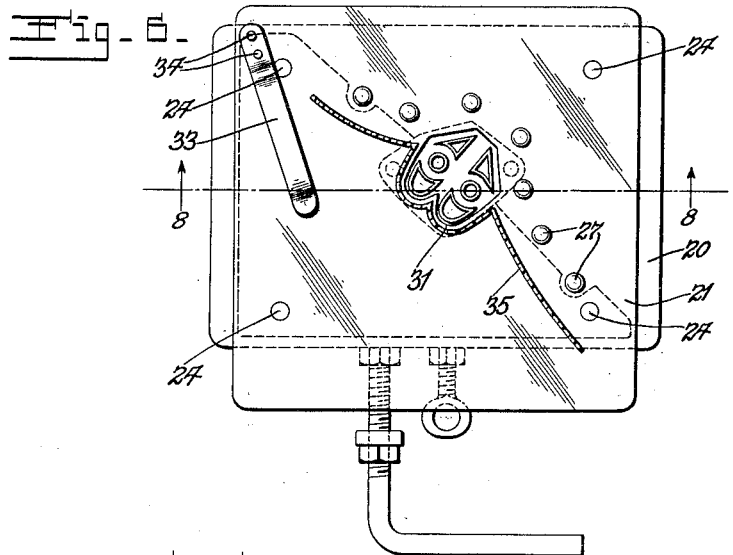
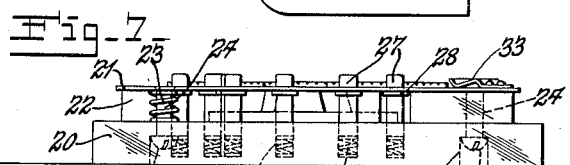
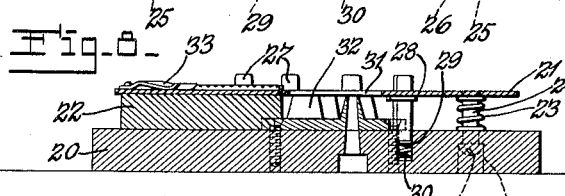
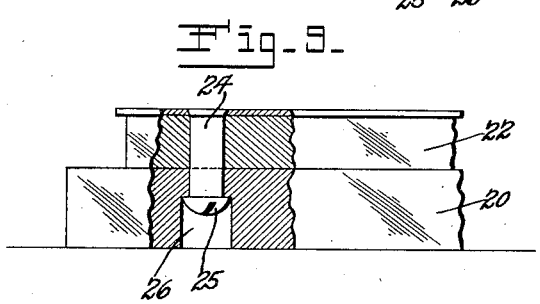
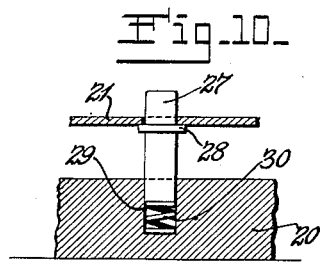
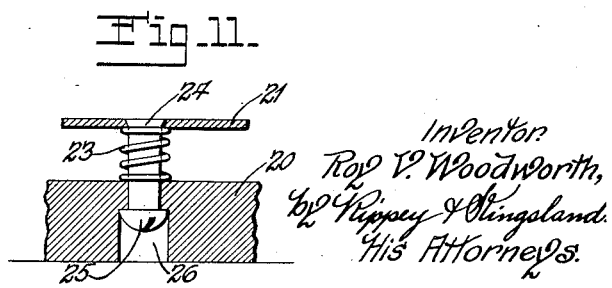
Inventor
Roy V. Woodworth,
by Rippey & Kingsland
His Attorneys Patented Oct. 29, 1929

1,733,638

UNITED STATES PATENT OFFICE

ROY V. WOODWORTH, OF ST. LOUIS, MISSOURI, ASSIGNOR TO WESTERN SUPPLIES CO., OF ST. LOUIS, MISSOURI, A CORPORATION OF MISSOURI

CUTTING DIE

Application filed September 19, 1928. Serial No. 306,958.

This invention relates to dies for cutting leather and other materials and for forming ornamental indentations upon the surfaces of such materials.

An object of the invention is to provide a die of the character mentioned having improved means for locating the material upon the die and for forming ornamental indentations upon or holes in the material.

Another object of the invention is to provide a die possessing all of the improvements and advantageous construction herein disclosed and as set forth in the respective claims, reference being made to the drawings in which Fig. 1 is a plan view of one embodiment of the invention.

Fig. 2 is a cross sectional view approximately on the line 2—2 of Fig. 1.

Fig. 3 is a sectional view approximately on the line 3—3 of Fig. 1.

Figs. 4 and 5 are detail views showing an indentor or perforator and the improved manner of securing it to the work supporting plate of the die.

Fig. 6 is a plan view of another form of die embodying the features of the invention.

Fig. 7 is a rear end elevation.

Fig. 8 is a cross sectional view approximately on the line 8—8 of Fig. 6.

Fig. 9 is an enlarged view showing the elastic substance upon which the work supporting plate is mounted.

Fig. 10 is a sectional view showing the means for mounting one of the gage pins.

Fig. 11 is an enlarged detail sectional view of one of the combined dies and supports for the work supporting plate.

In the embodiment of the invention shown in Figs. 1 to 3, inclusive, the base 1 is of any suitable solid substance, whether of metal or bakelite or other appropriate material. A sectional plate comprising a section 2 is yieldingly supported by springs 3 mounted upon the base 1 below the plate section 2 and encircling screws or pins 4. The pins or screws 4 at their upper ends are rigidly connected with the plate section 2 and have their lower ends projecting for sliding movements through holes in the base 1 and provided with heads 5 limiting upward extent of movement and operating in recesses 6. A gage or abutment 7 is secured upon the plate section 2 adjacent to each side edge and the side edges of said gages have the same configuration as the edges of the material to be operated upon.

At each side of the plate section 2 and slightly spaced therefrom a work supporting or stripper plate section 8 is mounted. These stripper plates or plate sections 8 are supported upon sections of appropriately elastic and resilient material 9, such as rubber. Obviously, other resilient means may be used to cooperate with the resilient supports 9 or independently thereof, as desired. These plates 8 are rigidly secured to the upper ends of pins 10 which project downwardly through holes in the base 1 and have heads 11 on their lower ends to prevent detachment of the plates 8. These plates 8 are approximately in the same plane as the plate 2 which is below the upper sides of the gages 7. If desired, leaf springs 12 may each have one end secured to the plate 8 by fasteners 13 and the other end free to clasp upon the work which may readily be passed under the free ends of said spring to position against the edges of the gages 7.

Each of the plates 8 is shaped to provide an opening 14 therethrough, which opening may or may not intersect the edge of the plate, as desired. As shown, the openings 14 do intersect the edges of the respective plates. These openings are above the cutter dies 15 which are rigid on the base 1 and project upwardly, having their upper edges terminating below the plane of the upper sides of the plates 8.

My invention comprises indenting means in connection with the plates 8 for forming ornamental indentations in the surface of the work. As shown, each plate 8 has secured thereto a metallic strip 16 notched in its upper edge to provide teeth or shoulders 17 which will form indentations in the work when the die is used. The construction and manner of attachment of these strips 16 is clearly shown in Figs. 4 and 5, wherein it will be seen that each strip 16 is formed on its under edge with a number of pointed projections 18 which are extended through correspondingly spaced holes in the plate 8 and thereafter hammered or swaged to form heads 19 which will firmly attach the strips to the plates. These strips may be of any desired length and configuration so as to form indentations of any desired length and shape. As shown in Fig. 1, a strip 16 is attached to each of the plates 8 along the edges thereof toward the gages 7 and curved about the holes 14, but it is obvious that this construction and arrangement may be varied.

The device shown in Figs. 6 to 11, inclusive, comprises a base 20 of any appropriate material, such as metal or bakelite or the like. A plate 21 is supported above the base 20 by a resilient and elastic substance 22 at one side and by a spring 23 at the other side. The resilient and elastic substance 22 may be of rubber. The plate 21 is attached to the upper ends of retaining pins 24 which project downwardly through holes in the base 20 and have heads 25 on their lower ends enclosed in recesses 26 in the under side of the base. The spring 23 encircles one of these pins 24 and cooperates with the element 22 to form a resilient support for the plate 21.

The gage devices shown comprise pins 27 projecting freely through holes in the plate 21 and having circumferential flanges or collars 28 contacting with the under side of the plate 21 and limiting upward extent of movement of the pins 27. The lower ends of the pins 27 project into holes 29 in the base 20 and are resiliently supported by springs 30 enclosed in said holes 29.

The plate 21 has a hole 31 above a cutting or indenting die 32 which projects upwardly from the base 20. A work retaining device comprising a spring 33 has one end secured to the plate 21 by fasteners 34 and the opposite end is free to grasp the work upon the plate 21. It will be understood that the gage pins 27 are arranged in proper relationship to the edge of the work so that when the work is placed upon the device it will be shaped and retained in proper position for operation to cause the die 32 to perform its work properly.

This form of the invention also includes an indenting device 35 attached to the plate 21 just as the strip 16 is attached to the plate 8, as shown in Figs. 4 and 5 and as previously described. This indenting device may be of any desired length and configuration.

From the foregoing it will be apparent that I have provided an improved die for producing ornamental designs upon leather or the like and that such die is highly useful in the manufacture of shoes and for other purposes. The construction, arrangement and relationship of the parts may be varied otherwise than as specifically described and I contemplate such variations as may be deemed expedient and as are within the scope of the appended claims.

What I claim is:—

1. A die of the character described comprising a base, a flat body of elastic material mounted on the base, a die rigid with and projecting upwardly from the base, a plate seated on said body of material and having an opening above and through which said die may pass when said plate is depressed, guide elements projecting upwardly through said base and having their upper ends attached to said plate and limiting extent of upward movement of said plate and permitting downward movement of said plate as said body of elastic material is compressed, and a gage supported beyond the side edge of said body for the work placed upon said plate.

2. A die of the character described comprising a base, a die rigid with and projecting upwardly from the base, a plate above said base and having an opening above and through which said die may pass when said plate is depressed, guide elements projecting upwardly through said base and having their upper ends in connection with said plate and limiting extent of upward movement of said plate and permitting downward movement of said plate, a wide and flat body of resilient and elastic material mounted on said base and held from lateral movement by said guide elements and permitting depression of said plate to an extent to project said die through said openings in said plate, a gage for the work that is placed upon said plate, and an elongated strip having spaced notches in its upper side edge forming an indenting device for forming indentations in the work attached to and projecting upwardly from said plate.

3. A die of the character described comprising a base, a plate above said base, guide elements projecting upwardly through said base and having their upper ends attached to said plate, means in connection with said guide elements limiting extent of upward movement of said plate and permitting downward movement of said plate, a gage for engaging one edge of the work, an elongated strip having spaced notches in its upper side edge forming an indenting device for the work attached to and projecting upwardly from said plate, and a resilient and elastic support on said base for supporting said plate.

4. A die of the character described comprising a base, a plate above said base, guide elements projecting upwardly through said base and having their upper ends attached to said plate, means in connection with said guide elements limiting extent of upward movement of said plate and permitting downward movement of said plate, a gage for engaging one edge of the work, an indenting device for the work attached to and projecting upwardly from said plate, a resilient and elastic support on said base for supporting said plate, and means supported by said plate for engaging and holding the work in proper position upon said indenting device.

5. A die of the character described comprising a base, a cutting die projecting upwardly from said base, a plate above said base having an opening through which said die may project when said plate is depressed, a metallic strip for indenting the work, means for holding said metallic strip rigid on the upper surface of said plate, elastic means supporting said plate above the plane of the upper edge of said die, gage elements, and springs actuating said gage elements upwardly and permitting depression of said gage elements with the work and with said plate.

6. A die of the character described comprising a base, a cutting die projecting upwardly from said base, a plate above said base having an opening through which said die may project when said plate is depressed, elastic means supporting said plate above the plane of the upper edge of said die, gage elements, springs actuating said gage elements upwardly and permitting depression of said gage elements with the work and with said plate, and an indenting device supported by said plate for forming an indentation in the work.

7. A die of the character described comprising a base, a cutting die projecting upwardly from said base, a plate above said base having an opening through which said die may project when said plate is depressed, elastic means supporting said plate above the plane of the upper edge of said die, gage elements, springs actuating said gage elements upwardly and permitting depression of said gage elements with the work and with said plate, an indenting device supported by said plate for forming an indentation in the work and resilient means for engaging and holding the work upon said plate and said indenting device.

8. A die of the character described comprising a base, a cutting die projecting upwardly from said base, a plate above said base for supporting the work that is to be pressed against said die, elastic means for supporting said plate and permitting said plate to be pressed in a direction and to an extent to press against said die the work that is on said plate, a metallic strip seated on said plate adjacent to said die and arranged to form indentations in the work of less depth than the thickness of the work, and means for holding said strip in rigid connection with said plate.

9. A die of the character described comprising a rigid base, a work supporting plate, resilient means on said base for supporting said plate, a metallic strip mounted on said plate for indenting the work, means for holding said metallic strip in rigid connection with said plate, and a gage for locating the work on said plate in proper position for the action of said strip.

10. A die of the character described comprising a work supporting plate, a metallic strip mounted on said plate for indenting the work, means for holding said metallic strip in rigid connection with said plate, a gage for locating the work on said plate in proper position for the action of said strip, and a die between said strip and said gage for cutting the work.

11. A die of the character described comprising a base, a plate for supporting the work, elastic means for supporting the plate above said base, a metallic strip seated on said plate for indenting the work, means securing said strip in rigid connection with said plate, a gage for locating the work on said plate properly for action of said strip, and a die rigid with said base between said strip and said gage.

12. A die of the character described comprising a base, a plate for supporting the work, elastic means for supporting the plate above said base, a metallic strip seated on said plate for indenting the work, means securing said strip in rigid connection with said plate, a gage for locating the work on said plate properly for action of said strip, a die rigid with said base between said strip and said gage, and springs supporting said gage above said base and permitting movement of said gage toward said base concurrently with the movement of said plate.

13. A die of the character described comprising a base, gaging means for the work, springs supporting said gaging means yieldingly above said base, a plate for supporting the work with one edge of the work in contact with said gaging means, a metallic strip seated on the upper side of said plate for indenting the work, and means for holding said strip in rigid connection with said plate.

14. A die of the character described comprising a base, gaging means for the work, springs supporting said gaging means yieldingly above said base, a plate for supporting the work with one edge of the work in contact with said gaging means, a metallic strip seated on the upper side of said plate for indenting the work, means for holding said strip in rigid connection with said plate, and a die rigid with said base between said strip and said gaging means.

15. A die of the character described comprising a rigid die for cutting the work, a depressible plate for supporting the work in position in which said work will be cut by said die when said plate and said work are depressed, a metallic strip seated on said plate and having upwardly extended projections along its upper edge for indenting the work, and means for holding said strip in connection with said plate.

16. A die of the character described comprising a base, a die rigid with and projecting upwardly from said base, a plate above said base and having an opening above and through which said die may pass when said plate is depressed, an elongated strip seated on said plate for indenting the work, means attaching said strip to said plate, guide elements projecting upwardly through said base and having their upper ends in connection with said plate and limiting extent of upward movement of said plate and permitting depression of said plate, and a body of elastic material mounted on said base and permitting depression of said plate to an extent to project said die through said opening in said plate.

17. A die of the character described comprising a base, a die rigid with and projecting upwardly from the base, a plate above said base and having an opening above and through which said die may pass when said plate is depressed, an elongated strip attached to the upper side of said plate for indenting the work, guide elements projecting through said base and having their upper ends in connection with said plate and limiting extent of upward movement of said plate and permitting depression of said plate, a body of elastic material mounted on the base and permitting depression of said plate to an extent to project said die through said opening in said plate, a gage for the work that is placed upon said plate and said strip, and means for holding the work in contact with said gage and across said opening in said plate.

ROY V. WOODWORTH.